(12) United States Patent
Hubauer et al.

(10) Patent No.: US 9,696,179 B2
(45) Date of Patent: Jul. 4, 2017

(54) PRODUCT SENSOR, PRODUCT WITH THE PRODUCT SENSOR, SYSTEM AND METHOD FOR ALLOWING COMMUNICATION BETWEEN THE PRODUCT SENSOR AND THE SYSTEM

(75) Inventors: Thomas Hubauer, München (DE); Christoph Legat, Olching (DE); Christian Seitz, Nürnberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 112 days.

(21) Appl. No.: 14/110,228

(22) PCT Filed: Mar. 28, 2012

(86) PCT No.: PCT/EP2012/055461
§ 371 (c)(1),
(2), (4) Date: Oct. 7, 2013

(87) PCT Pub. No.: WO2012/136526
PCT Pub. Date: Oct. 11, 2012

(65) Prior Publication Data
US 2014/0022093 A1 Jan. 23, 2014

(30) Foreign Application Priority Data
Apr. 5, 2011 (DE) .................. 10 2011 006 786

(51) Int. Cl.
*G01D 4/00* (2006.01)
*G05B 19/418* (2006.01)
*G06Q 10/08* (2012.01)

(52) U.S. Cl.
CPC ........... *G01D 4/00* (2013.01); *G05B 19/4183* (2013.01); *G06Q 10/0832* (2013.01);
(Continued)

(58) Field of Classification Search
CPC .................. G01D 4/00; G05B 19/4183; G05B 2219/31095; G05B 2219/31283;
(Continued)

(56) References Cited

U.S. PATENT DOCUMENTS

| | | | |
|---|---|---|---|
| 5,410,495 A * | 4/1995 | Ramamurthi | G05B 9/02 702/100 |
| 6,751,518 B1 * | 6/2004 | Sonderman | H01L 21/67276 700/110 |

(Continued)

FOREIGN PATENT DOCUMENTS

| | | |
|---|---|---|
| CN | 101018236 A | 8/2007 |
| DE | 10042481 | 6/2002 |

(Continued)

OTHER PUBLICATIONS

English language International Search Report for PCT/EP2012/055461, mailed Jun. 8, 2012, 2 pages.
(Continued)

*Primary Examiner* — Brian Wilson
(74) *Attorney, Agent, or Firm* — Slayden Grubert Beard PLLC

(57) ABSTRACT

A product may be provided with a product sensor, thus making it possible to determine, together with the product, data relating to a system or a machine with the aid of the product sensor. The data determined can be used to diagnose and/or control the system or machine. In this case, it is advantageous that the data are obtained at the location of the product and it is thus possible to directly determine a desirable or undesirable effect (for example of environmental parameters or of the system itself) on the product. This system can be used, for example, in automation, in systems or machines or in different product manufacture variants.

13 Claims, 5 Drawing Sheets

(52) U.S. Cl.
CPC ............ *G05B 2219/31095* (2013.01); *G05B 2219/31283* (2013.01); *G05B 2219/33192* (2013.01); *Y02P 90/10* (2015.11); *Y02P 90/14* (2015.11); *Y02P 90/18* (2015.11); *Y02P 90/185* (2015.11); *Y02P 90/28* (2015.11)

(58) Field of Classification Search
CPC ........ G05B 2219/33192; G05B 19/418; G05B 19/4185; G05B 19/4182; G05B 2219/2621; G05B 2219/31002; G05B 2219/31266; G05B 2219/31268; G05B 2219/3126; G05B 2219/31274; G05B 2219/31281; G05B 2219/31432; G05B 2219/32121; G05B 2219/39102; G05B 2219/39106; G05B 2219/50397; G05B 2219/14058; G05B 2219/14063; G05B 2219/14064; G05B 2219/14084; G05B 2219/24048; G05B 2219/24053; G05B 2219/24065; G05B 2219/31434; G05B 2219/33299; G06Q 10/0832; Y02P 90/14; Y02P 90/185; Y02P 90/18; Y02P 90/28; Y02P 90/10; B65G 43/00; B65G 43/08; B65G 43/10; B65G 2811/0673; B65G 2811/0678; B65G 2811/093
USPC ............ 340/870.02, 676; 700/108, 109, 110, 700/112, 113, 117, 213, 222, 229
See application file for complete search history.

(56) References Cited

U.S. PATENT DOCUMENTS

| | | | | |
|---|---|---|---|---|
| 6,966,235 | B1* | 11/2005 | Paton | G01D 11/245 29/407.05 |
| 7,209,846 | B2* | 4/2007 | Tamaki | G06Q 10/06 700/109 |
| 2002/0077723 | A1 | 6/2002 | Schoop | |
| 2006/0184379 | A1* | 8/2006 | Tan | G06Q 10/10 705/302 |
| 2006/0234398 | A1* | 10/2006 | Gluschenkov | H01L 21/67294 438/5 |
| 2007/0052541 | A1 | 3/2007 | Opgenoorth et al. | |
| 2007/0107523 | A1* | 5/2007 | Galewski | G01L 9/0052 73/754 |
| 2007/0210923 | A1* | 9/2007 | Butler | G06K 7/0008 340/572.8 |
| 2007/0284430 | A1* | 12/2007 | Rock | H04Q 9/00 235/375 |
| 2007/0294001 | A1* | 12/2007 | Underdal | G06N 7/005 701/31.4 |
| 2010/0262332 | A1* | 10/2010 | Gilbert | G06Q 10/06 701/29.6 |
| 2012/0209410 | A1 | 8/2012 | Fantana et al. | |

FOREIGN PATENT DOCUMENTS

| | | |
|---|---|---|
| DE | 102005042532 | 3/2007 |
| DE | 102008053200 | 4/2010 |
| DE | 102009037302 | 2/2011 |
| DE | 102011006786.8 | 4/2011 |
| EP | 0433756 | 6/1991 |
| EP | 1918722 | 5/2008 |
| WO | PCT/EP2012/055461 | 3/2012 |

OTHER PUBLICATIONS

English language Written Opinion for PCT/EP2012/055461, downloaded from WIPO on Oct. 7, 2013, 9 pages.
Chinese Office Action issued Jun. 3, 2015, in Chinese Patent Application No. 201280017218.7.

* cited by examiner

PRODUCT SENSOR, PRODUCT WITH THE PRODUCT SENSOR, SYSTEM AND METHOD FOR ALLOWING COMMUNICATION BETWEEN THE PRODUCT SENSOR AND THE SYSTEM

CROSS REFERENCE TO RELATED APPLICATIONS

This application is based on and hereby claims priority to International Application No. PCT/EP2012/055461 filed on Mar. 28, 2012 and German Application No. 10 2011 006 786.8 filed on Apr. 5, 2011, the contents of which are hereby incorporated by reference.

BACKGROUND

The invention relates to a product sensor, a product with at least one product sensor of this kind, an installation with a diagnosis device and a method for communication between the product sensor and the installation.

To guarantee product-specific requirements of a manufacturing process, e.g. avoiding tremors or vibrations during the transportation of a product following a particular manufacturing step or avoiding prescribed temperatures being exceeded (for example when the product is perishables), suitable sensors need to be installed throughout the installation as appropriate. However, precisely the effects of disturbances or other ambient parameters in the installation on the product itself can be established only to a limited degree by sensors that are mounted on components of the installation.

Frequently, faults in installation components have a direct effect on the product, e.g. a defective axle brings about undesirable vibration in the product. It is extremely complex to measure such effects using sensors installed in the installation. In addition, it is disadvantageous that the multiplicity of sensors required for this are not necessary for the control process of the installation, but contribute to increased complexity that needs to be overcome logistically (connection of the multiplicity of sensors) and in terms of communication engineering (protocols for communication with the sensors and evaluation of the communication) and hence increases the installation costs and also the upkeep of the installation. When adjusting the production process or during the production of further (particularly other) products, it might be necessary to revise the entire installation in order to match it to the new production-specific or product-specific requirements regarding the sensors that are necessary for checking the quality of the production result.

SUMMARY

One possible object is to avoid the disadvantages cited above and particularly to provide a solution for efficient operation of an installation.

The inventors propose a product sensor for a product that can be transported, produced or machined in an installation, having a data processing unit for providing measured data or data derived therefrom for the installation.

In this context, an installation is intended to be understood to mean any installation in which products can be produced, machined, processed and/or transported. The installation may also be a machine. In particular, the installation may be a manufacturing installation or an automation installation.

By way of example the product sensor is, inter alia, a sensor for capturing a physically or chemically measurable variable. This variable is preferably available in the form of (digital and/or analog) data that can be processed further by the processing unit. In this sense, measured data can also be conditioned or (pre)processed by the processing unit to form "derived" data. The data and/or the derived data are provided for the installation. This provision can take place actively in the form of transmission to the installation; alternatively, it is possible for the installation (or a processing unit in the installation) to request the data from the product sensor. The provision or transmission of the data and/or of the derived data can take place regularly or irregularly, e.g. upon the occurrence of prescribed events or times, or when predefined positions in space (what are known as gateways) are reached.

Advantageously, monitoring a manufacturing or transportation installation in this case does not require a large number of sensors to be fitted on the installation itself in order to obtain information about the state of the installation—particularly where this has an influence on the product. Instead, the product sensor can be arranged (e.g. detachably mounted) on each of the products or on some of the products. This allows effective capture of measured variables close to the product. In the event of disturbances, an interface device of arbitrary design can be used to transmit the data or the derived data to a control entity or diagnosis device (e.g. of the installation or of a central diagnosis device) immediately or later. By way of example, the data from the product sensors can thus be used for diagnosing manufacturing systems in parallel with the execution time in order to spot faults whose effects can be observed directly on products and to use them for diagnosing the entire system, for example.

One development is that the product sensor can be mounted on the product.

It is also a development that the product sensor is incorporated in the product or in a material carrier for the product.

The product sensor may be in the form of an active sensor or may have at least one connection option for a sensor. By way of example, the product sensor is in mobile form and can be mounted on the product. In particular, the product sensor may be detachably connected to the product.

The product sensor may also be mounted on a material carrier for the product. By way of example, such a material carrier may be a transportation palette that holds and/or carries the product and, by way of example, performs a separate function, and one that is independent of other components in the installation (e.g. conveying the product), together with the product.

Another development is that the processing unit is designed to store the measured data or the derived data.

In particular, it is a development that the processing unit and/or the product sensor has/have a communication interface that can be used to transmit the measured data or the derived data to the installation.

The communication of the data and/or of the derived data can take place unidirectionally or bidirectionally via the communication interface. To this end, a communication protocol can be used that allows secure and/or fault-tolerant transmission and that can possibly be used to establish that the communication is not working properly.

One development in this regard is that the communication interface is a wireless or wired communication interface.

Thus, the data and/or the derived data can be transmitted via a radio link, e.g. via a mobile radio interface, a WLAN link, a Bluetooth link, by induction, etc. It is also possible for a wired communication interface to be used, for example in order to be able to transmit captured data (and possibly data derived therefrom). By way of example, electric contact can be made at particular locations in a transport system, as a result of which this making of contact can be used to implement fault-tolerant, secure and fast data transmission.

The communication with the installation can be prompted by the product sensor or by the installation. The product sensor can therefore respond to a request from the installation or can transmit the data to the installation of its own accord.

In addition, the communication can take place at prescribed times, at prescribed locations in the installation (or of the product in the installation) and/or when prescribed states or conditions are present. It is also possible for the communication to take place in prioritized fashion, so that a disturbance or a fault can quickly be sensed by the installation.

It is also a development that the provision of the data or of the derived data meets realtime requirements.

Hence, the product sensor may be designed such that the data can be forwarded to the installation while observing realtime conditions. To this end, the product sensor is preferably equipped with correspondingly fast hardware. Preferably, in this case, a communication interface is used that likewise meets realtime requirements. This allows the product sensor also to be used for realtime control of the installation.

In addition, it is a development that the product sensor can be used to ascertain or measure at least one selection from the following variables and to provide them for the installation in the form of data:
a temperature;
a relative or absolute position of the product sensor;
a movement, acceleration or orientation of the product sensor;
a vibration.

In principle, the product sensor can provide any physically or chemically measurable variable in the form of data (or derived data).

Within the context of an additional development, the processing unit is set up such that the measured data and/or the derived data can be monitored.

By way of example, the measured data and/or the derived data can be stored progressively, at particular (prescribed) times or when particular (prescribed) events occur. By way of example, this allows efficient documentation of the manufacturing process, because even retrospectively (e.g. for quality assurance) it is possible to establish those influences to which the product was exposed during manufacture in the installation or whether prescribed manufacturing conditions were observed for this product. Accordingly, by way of example, a manufacturing protocol can indicate that prescribed ambient parameters were in a prescribed range during the manufacture of the product and hence the manufacture took place in proper fashion. Accordingly, it is also possible to reveal quality defects that cannot be recognized on the finished product from the outside before the product is actually delivered or used.

In particular, it is possible for the processing unit to compare the actual measured data and/or the derived data with prescribed values and to provide an appropriate report for the installation, e.g. to transmit it to the installation, in the event of a deviation (e.g. a prescribed threshold value being exceeded or undershot). On the basis of this report, the installation can then have a suitable measure initiated in order to recognize faulty products as quickly as possible or to prevent further possibly faulty products from being produced.

In principle, the measured data or the derived data can therefore be evaluated in the product sensor (the processing unit of the product sensor) and/or in the installation (a processing or diagnosis unit in the installation). Countermeasures are preferably initiated by the installation. The communication between installation and product sensor may be unidirectional or bidirectional. In particular, different protocols can be used, so that, by way of example, a secure communication link (e.g. by radio) between product sensor and installation ensures that the messages interchanged arrive or that failure of the communication link can be noticed.

A subsequent development is that the processing unit can be used to ascertain a symptom on the basis of the measured data or the data derived therefrom.

One refinement is that the symptom can be used to determine a diagnosis for the installation.

An alternative embodiment is that the symptom can be used to determine a diagnosis for the installation on the basis of at least one assumption.

By way of example, assumptions can be made that assume that there are symptoms that have not yet been recognized. In this case, it is possible to sense faults or disturbances that have not yet or not yet completely occurred. The quantity of data already available can thus be used to infer a quantity of possible disturbances. These disturbances can be plausibilized using collected data or other knowledge, so that even despite incomplete data for a final assessment of a fault it is entirely possible to make statements regarding the probability of the occurrence of this fault.

In this context, it should be noted that the system can be determined on the basis of the measured data and/or the derived data in the installation and/or in the product sensor, particularly in the processing unit of the product sensor. In addition, the diagnosis can be performed by the product sensor and/or by the installation. Advantageously, the installation can resort to a multiplicity of different data for producing the diagnosis. In this case, the quantity of possible assumptions can also be restricted by taking account of symptoms or data that are already present, which means that diagnosis is possible early and particularly in good time.

The above object is also achieved by a product having at least one of the product sensors described here.

The aforementioned object is also achieved using an installation with a diagnosis device for communication with at least one product sensor as described herein.

The diagnosis device may have a communication interface for communication with the product sensors. In particular, the transmitted data from a plurality of product sensors can be taken as a basis for producing a diagnosis relating to the installation or a portion of the installation.

The object is also achieved by proposing a method for communication between a product sensor and an installation,
in which the product sensor determines measured data for a product that can be transported, produced or machined in the installation,
in which the measured data or data derived therefrom are transmitted to the installation.

By way of example, the measured data are determined by virtue of a sensor or a sensor module measuring physical, electrical and/or chemical variables and providing them in the form of data.

One development is that the measured data or the derived data are taken as a basis for performing a diagnosis for the installation.

In addition, it should be noted that the processing unit of the product sensor may have, inter alia, a processor unit that may be in the form of any processor or calculator or computer with correspondingly necessary peripherals (memory, input/output interfaces, input/output devices, etc.). Accordingly, the installation may have at least one such processor unit, e.g. for performing the diagnosis described here.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
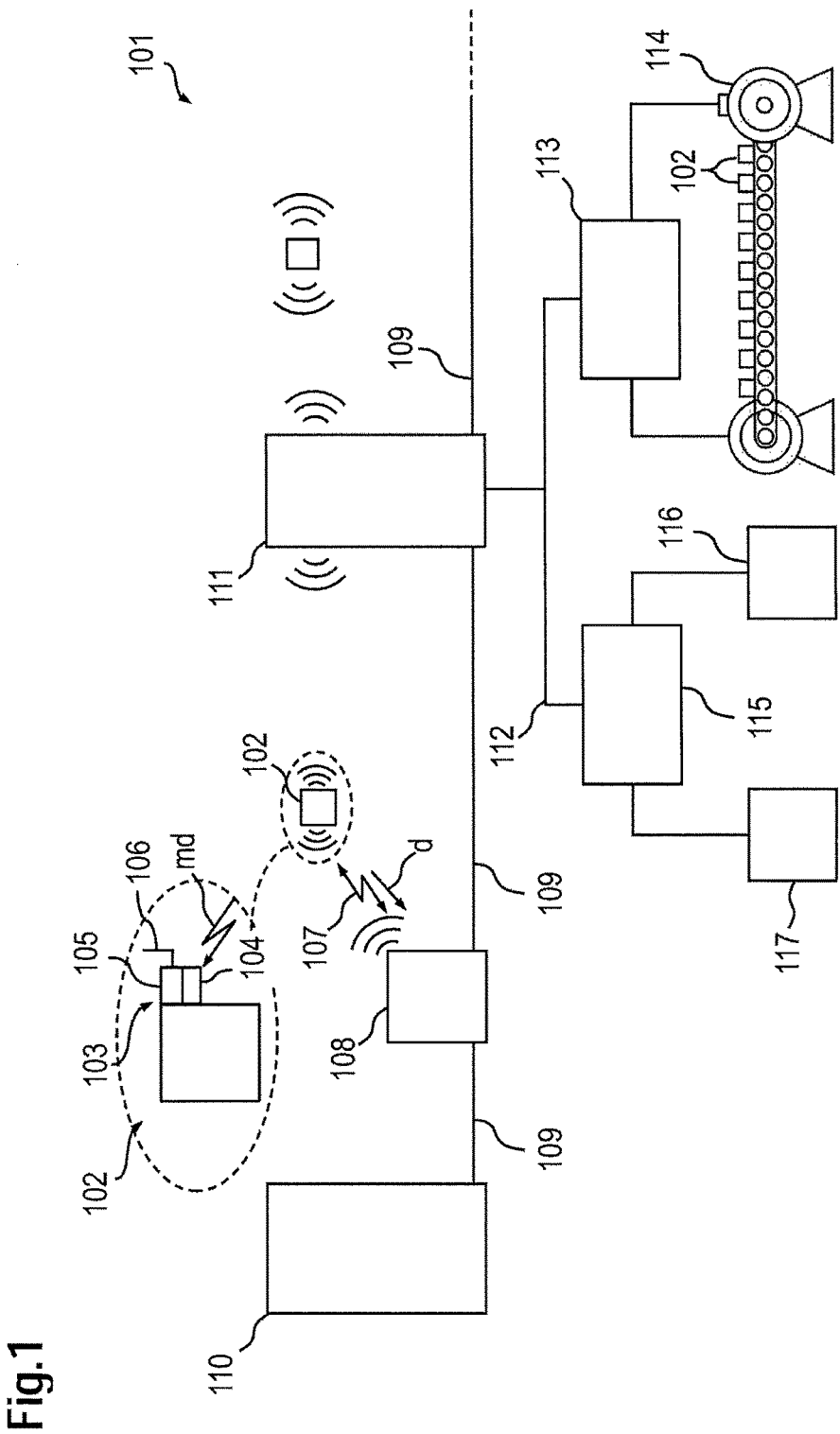
FIG. 1 schematically shows components of an installation for manufacturing or transporting products and of an installation controller using product sensors on the products.

Reference will now be made in detail to the preferred embodiments of the present invention, examples of which are illustrated in the accompanying drawings, wherein like reference numerals refer to like elements throughout.

A product can have at least one product sensor. It is also possible for such a product with at least one product sensor to be called an intelligent product. In particular, an intelligent product of this kind may be an embedded system with sensors that are mounted on material carriers or on workpieces. In addition, the intelligent product may have a processing unit that has a piece of control software, for example, that can be used to process the data ascertained (e.g. measured) by the sensors progressively or at prescribed times, e.g. by performing a comparison with prescribed values so as to recognize, control and/or document deviations in the manufacturing process for the product. By way of example, it is thus possible to provide the information concerning product quality on the basis of this data upon request.

In the present context, a product is equipped with at least one product sensor (for example as an embedded system), the at least one product sensor being used to observe the environment and to capture product-relevant data and transmit them to the installation. By way of example, the product-relevant data are data that relate to production, processing, machining and/or transportation of the product. The data may be measured data, derived data or process parameters, e.g.:

- a temperature of the product or close to the product (particularly advantageous when the product is perishables);
- a welding temperature during the manufacture of the product;
- a tremor that is recorded on the basis of position as the product moves along a conveyor belt.

The installation receives the data and can use them for quality assurance, diagnosis and/or monitoring of the installation, for example. It is thus possible, for example in the case of maintenance, to provide important information, or to be able to take action in the installation or the components or control functions thereof as quickly as possible in the event of a disturbance.

Product sensors can be mounted directly in or on the product. It is also possible for sensors or even the product sensors to be actually fitted fully or in part on or in material carriers in a material flow system.

The application of mobile product sensors is therefore advantageously used as an information provider for the diagnosis for the installation.

Besides this local, product-centered role, the product can also take on a global role as information provider for diagnosis systems installed in the installation. To this end, the data from the sensors are interpreted selectively or completely depending on the instance of application and are transmitted to the diagnosis system as what are known as symptoms, for example, by installed radio modules. Thus, product-specific process requirements and/or product-dependent effects of faults, e.g. temperature fluctuations or vibrations, can easily be determined and can additionally be used to diagnose faults in the entire manufacturing system by transmitting them to the diagnosis system.

By way of example, the symptom can be understood to mean measured data or data obtained therefrom that are associated with a particular measured variable. In this case, the measured variable has associated threshold values or fixed limit values, for example, that represent a critical installation state or a disturbance state that has occurred or that can be assumed. In this case, the measured variables may be physically or possibly chemically measurable variables, in particular.

The planning or adjustment of an installation (e.g. a manufacturing installation) can already take account of intelligent products or product sensors for products. The real time capability that is often necessary in the case of sensors for automation is optional depending on the refinement; in particular, such realtime capability is dispensable if the sensors are not used for controlling the installation. However, the actual planning of the quality assurance can take account of the sensors in order to be able to recognize possible quality losses in the product in reliable and/or timely fashion using the additional data. This means that is also possible for reliability demands on the installation to be increased.

Thus, the integration of mobile product sensors on the product and the use of the ascertained data from said product sensors in the diagnosis system allow the product installation to be improved. One improvement is to be able to recognize (in timely fashion) faults in the installation that have a measurable effect on the product. The data in the form of measurements performed using the product sensors can be communicated to the diagnosis system, for example, as a result of which either faults can be recognized or there is a greater certainty of a fault being able to be identified. This is advantageous particularly when different diagnoses differ by virtue of their effect on the product.

In particular, a method for providing support for diagnostics in installations, e.g. manufacturing machines or installations, by data-capturing product sensors is provided. Data from sensors installed on intelligent products can be used for diagnosis of manufacturing systems in parallel with the execution time in order to spot systems whose effect can be observed directly on the products and to use said symptoms for diagnosis for the entire system. Accordingly, the installation or the entire system can be modified or adjusted. In particular, the installation can then be operated in another state, possibly with another task or programming.

Advantageously, it is therefore not necessary for a multiplicity of additional sensors to be installed in the entire installation for the purpose of monitoring the product quality, if this were actually possible from a technical and physical point of view. Instead, product sensors can be used flexibly on the basis of the respective product. If different types of products with different demands on production process are produced or machined, this allows the respective relevant material carrier and/or intelligent products to be equipped with the necessary sensors without the need for these to be permanently installed in portions of the installation. Particularly if the product sensors are not needed for controlling the installation, there is sometimes no need for realtime communication by the product sensors with the installation (and corresponding reaction from the installation within firmly prescribed time stipulations). This reduces the complexity and hence the costs of the installation and also of operation.

Furthermore, by way of example, product sensors installed on material carriers or on intelligent products can be used to improve the diagnosis in the installation, since the installation is capable, during fault-free operation, of working within an operating range that is prescribed for the product. Accordingly, the product sensors deliver data that correspond to the admissible operating range. If this admissible operating range is left, this can be established from the delivered data, be it by the product sensor itself (e.g. as an intelligent product with a processing unit) or by the installation (or a diagnosis system in the installation), which receives the data continuously or at prescribed (regular or irregular) times, for example.

The data can be transmitted to the installation by radio communication or by electrical contact being made.

FIG. 1 shows a schematic system design for an installation 101. The installation 101 is used to transport, process, machine and/or produce products 102.

Such a product 102, which can also be called an intelligent product, has a holding or mounting option for a product sensor 103. Preferably, such a product sensor 103 is arranged or mounted detachably on or in the product 102. Optionally, a product sensor 103 or sensors connected thereto may also be arranged on a product carrier (material carrier, e.g. carrier plate for the product).

The product sensor 103 shown in enlarged form by way of example has a processing unit 104 that comprises and possibly also processes or partially processes measured data md from ambient parameters. In particular, to this end, the processing unit 104 may be equipped with at least one sensor or at least one part for connecting a sensor. By way of example, the sensor can pick up movement data, ambient temperatures or other physically or chemically capturable variables and can provide them as measured data. Furthermore, the product sensor 103 has a communication interface 105 that has an antenna 106 for transmitting the measured data md or data d obtained therefrom. The communication interface may also be part of the processing unit.

The processing unit, the communication interface and the antenna may also be formed from a combination of an induction-coil-like antenna and a sensor connected directly thereto.

The measured data md and/or data d obtained therefrom are transmitted via a radio interface 107 to a gateway 108, for example, as an interface associated with the installation 101. The gateway 108 is connected by a bus 109 or a line to further components of the installation 101, for example to a diagnosis system 110 as an external system apparatus for the further processing of the measured or obtained data. The diagnosis system 110 may also be in the form of a component of a command and control center. In addition or as an alternative to the gateway 108, a computer or industrial PC (personal computer/desktop computer) 111 or a programmable logic controller (PLC) may also be designed to receive the measured data and or data d obtained therefrom from the communication interface 105 of the product sensor 103.

Instead of hardwired lines such as the bus 109 or the line for transmission based on a protocol such as TCP/IP (TCP: Transmission Control Protocol/a network protocol on the internet, IP: Internet Protocol), it is also possible to use any other suitable transmission systems, particularly including radio-based transmission systems. Similarly, instead of radio-based transmission of the data from the product sensor 103 to the gateway 108 or other components of the installation 101, it is possible to choose a direct line-coupled connection. Such a connection could be designed in the manner of what is known as a USB port, for example, and could allow connection by virtue of the product sensor or a cable coupled thereto being plugged into a computer, for example.

In the exemplary refinement, input/output subsystems 113, 115 in the installation 101 are preferably coupled via the industrial PC 111 and a further bus 112, connected thereto, on the basis of the PROFINET standard, for example. The first of the subsystems 113 is used for controlling a conveyor belt 114 and for monitoring the functionality thereof, for example. In particular, the subsystem 113 can be used to actuate a drive motor for the conveyor belt 114, and sensors, for example rotation sensors on a drive shaft, can be used to monitor rotation on a drive roller. The second subsystem 115 is used for actuating or monitoring further product processing, control or monitoring components 116, 117, for example.

Hence, the installation 101 is no longer able to be monitored only by sensors that are arranged on components of the installations, but rather the installation 101 can be monitored additionally or even completely by the product sensors 103 that are arranged on, in or close to the (intelligent) product(s) 102.

For transmitting the measurements and symptoms to the monitoring and diagnosis system, various refinements with specific characteristics can be implemented:

(i) the shortest time delay for simultaneously relatively high communication complexity is achieved when the intelligent product 102 sends relevant symptoms to the diagnosis system 110 immediately after they have been recognized. To this end, the intelligent product 102 is either equipped with long-range communication systems or the complete factory or installation 101 is comprehensively provided with communication points (e.g. WLAN access points, WLAN: Wireless Local Area Network).

(ii) Alternatively, the communication can take place only at or close to predefined communication gateways 108, 111, e.g. following the conclusion of a manufacturing section or following completion of the product. This substantially reduces the communication complexity, but the reaction time of the system to the symptoms detected by the product sensor is increased.

By way of example, the communication can be implemented contactlessly by radio engineering. When gateways 108 are used, the industrial PCs 111 installed for controlling the manufacturing system can be used as gateways.

Figure 2:
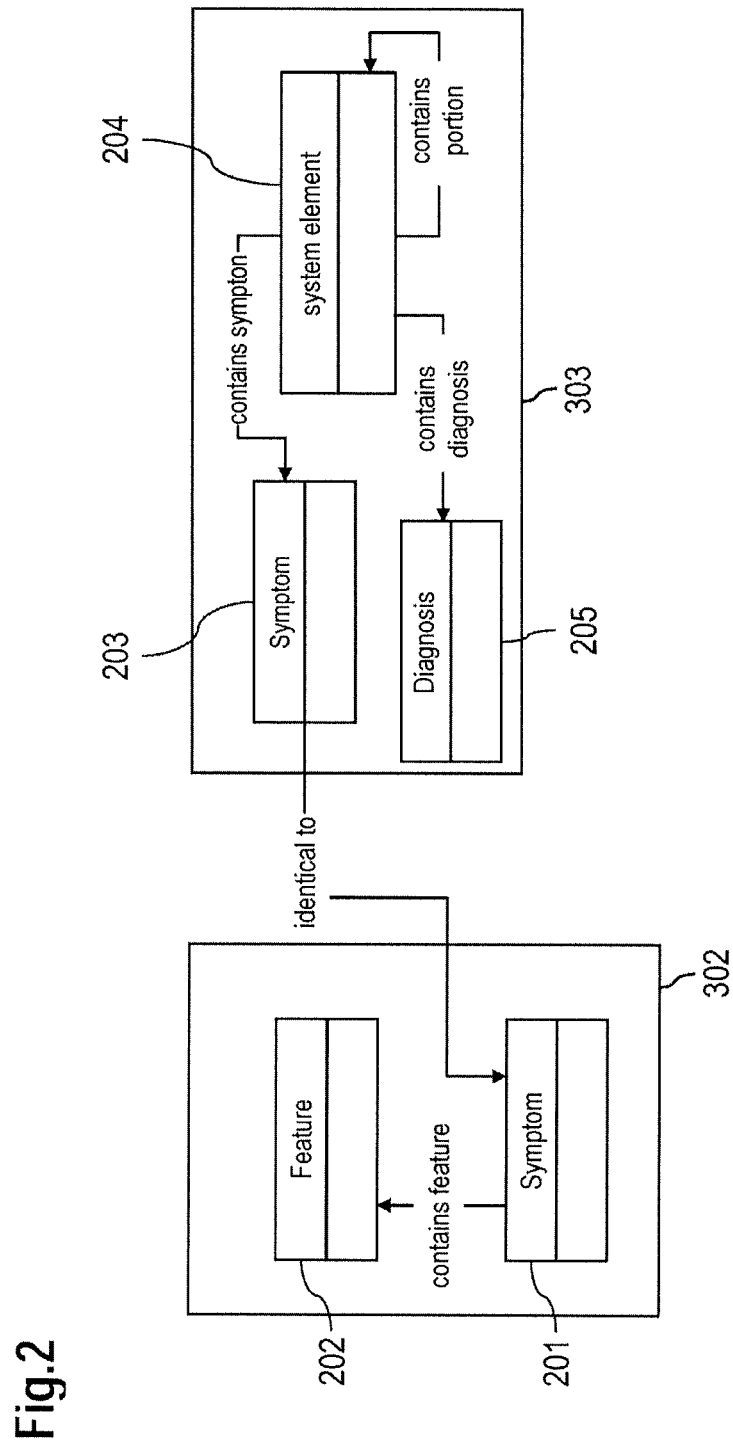
FIG. 2 shows function models, particularly of a product sensor for modeling an ambient situation and a feature model.

FIG. 2 shows components and functional or process flow features for capturing and processing the measured data d. In order for the data d measured by a sensor to be evaluated in the processing unit 104 of the product sensor 103 on the intelligent product 102, the diagnosis model outlined in simplified form in FIG. 2 is used. A feature represents the data d measured by the product sensor.

On the basis of a feature meta model 302, features are interpreted by the embedded system, so that symptoms, measured data and or data d obtained therefrom can be generated that describe properties of the environment of the product 102 or properties of the installation 101. The extent of the preprocessing is determined by the processing and storage capacity of the embedded system. Thus, current systems can align measured values with critical threshold values, aggregate data, or the like, for example.

By way of example, the feature meta model 302 is a model as may be incorporated in the product sensor: in this case, a symptom 201 has at least one feature 202. The symptom 201 corresponds to the definition of a symptom 203 from a situation meta model 303. A system element 204 comprises at least one symptom 203 and has at least one diagnosis 205. System elements may additionally be in a hierarchic portion/whole relationship.

Hence, an application scenario with a multiagent approach is also specified in which, by way of example, adaptive production of a product 102 is improved using interactive diagnostics. In this scenario, tremor-sensitive and tremor-insensitive products 102 are conveyed in a system of conveyor belts 114 simultaneously. By way of example, the product sensor 103 has a three-dimensional acceleration sensor and is arranged on a prototype of a product 102. The product sensor 103 (or the acceleration sensor) can be used to detect tremors or vibrations, and the measured values can be transmitted as data to the diagnosis system 110, which is subsequently also called a diagnosis agent, so as to diagnose possible faults in the conveyor belt 114.

By way of example, the approach presented here relates to an installation or production controller in which automated diagnosis is implemented, possibly together with interaction from an operator. This allows flexible adjustment of machine capabilities and helps to prevent damage in the event of deviations from prescribed operating states or other abnormalities. In particular, an interpretation can be made on a model basis. Hence, a diagnosis can be predicted by using a derived cause examination that involves plausibility threshold values, for example, with resultant ambiguities between competing approaches to a solution being resolved. To allow human intervention, suitable information apparatuses can be provided that inform an operator about disturbance states, for example. Thus, potential fault states can be sensed or avoided before they actually occur. The proposed architecture additionally incorporates intelligent products in the form of mobile sensors, which improves the robustness and reliability of the production system.

Rising demands on fast reactions to market trends and also the increasing extensive configurability of products for the customer result in greater flexibility demands from the production systems, particularly in respect of provision of flexible processes for relatively small item numbers and robustness in the face of faults within the technical system.

Product-oriented production systems that are supported by the product sensors or intelligent products described here are a promising approach particularly for products that are meant to be manufactured or machined in small numbers. The present concept shows a way for the product sensor to interact and cooperate with the production control system. The present approach allows a highly flexible and robust framework for the manufacture, machining and/or processing of a product particularly using a model-based diagnosis system, possibly assisted by operating personnel.

By way of example, a flexible production scenario is shown that can be used in conjunction with intelligent products and thus ultimately allows distinctly improved diagnosis, inter alia. In particular, a logistics system is considered by way of example, comprising a supplying unidirectional conveyor belt, a distributor and two selectable outgoing conveyor belts that lead to different machines, for example. Each conveyor belt section is driven by a shaft that is equipped with a sensor for measuring the shaft rotation. Since some products 102 to be transported may be sensitive to vibrations at particular times during production, for example on account of a freshly bonded joint that has not yet hardened, production sensors are equipped with a digital product memory and an acceleration sensor, so that acceleration measured values can be determined and stored for the purpose of quality assurance, for example. These product sensors are fitted on some (or alternatively on all) products.

The information delivered by the product sensors can be combined with additional measured values in order to allow diagnosis of the transport system. If the axle of a conveyor belt is rotating, for example, and a product that is arranged on the conveyor belt is not moving, this indicates a transmission problem or communication problem for the ascertained measured values or a drive problem in the conveyor belt. Hence, the conveyor belt might have become unusable until it is repaired. By way of example, irregular movements, e.g. sudden accelerations or vibrations, can also indicate bearing problems for the conveyor belt; in this case, the conveyor belt in question should not be used again for products that are sensitive to vibration until it is repaired. Depending on where the malfunction has been diagnosed and/or occurred, use for production can be selectively restricted, i.e. that portion of the installation (e.g. one of the conveyor belts) is deliberately no longer used for products for which the malfunction could be harmful. The other portions of the installation could continue to be used without alteration. It is also possible for that portion of the installation that has only restricted functionality to be deliberately used for another product, e.g. until it is repaired again. This can prevent failure of the installation or reduces the idle time for the installation (since the installation can continue to be used in modified form until it is repaired, for example). This can actually be taken into account during production planning in order to optimize the use of the installation, e.g. in respect of the throughput, with guaranteed product quality.

Architecture

Figure 3:
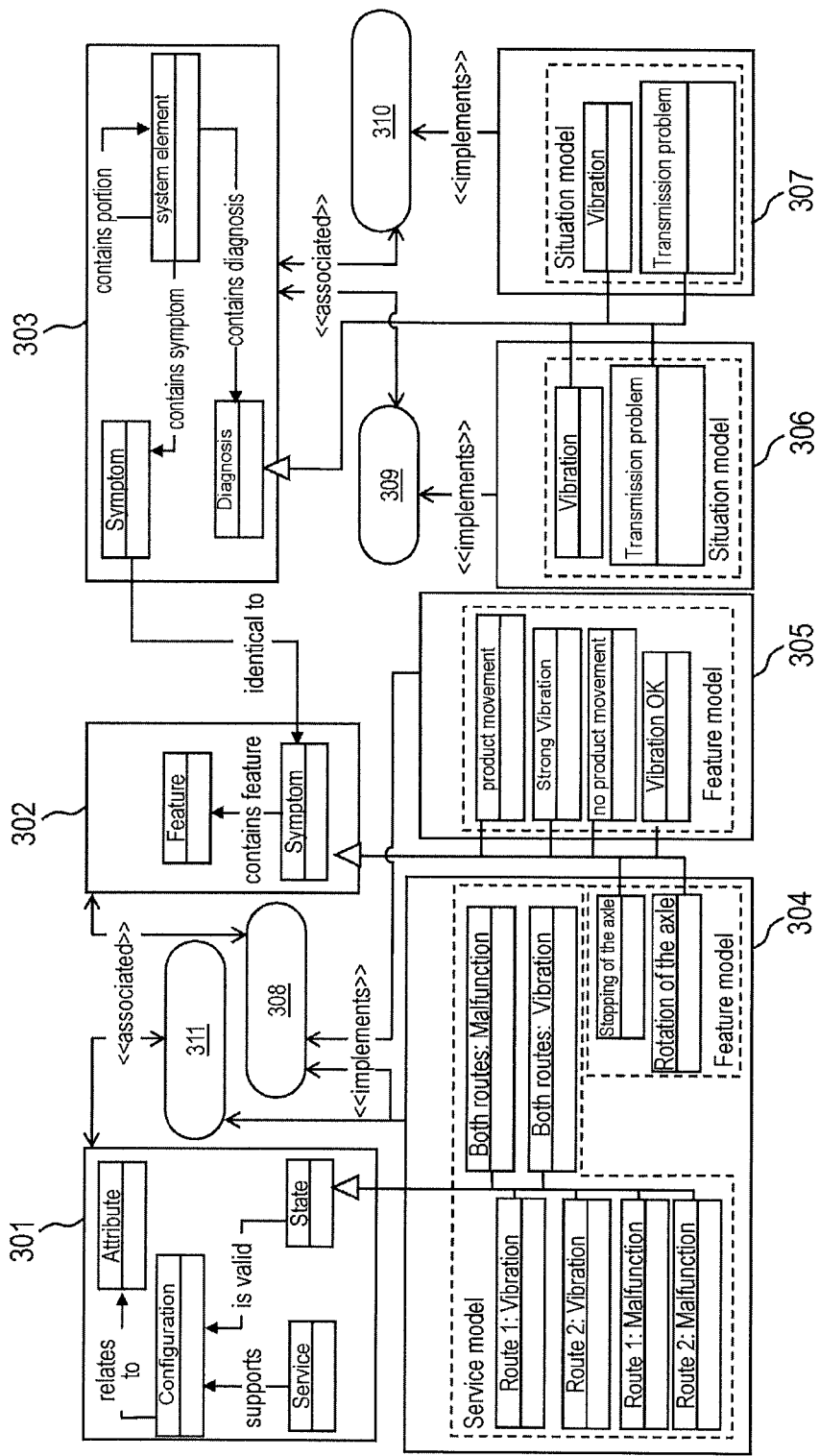
FIG. 3 shows functions, agents and models—interacting therewith—of preferred data processing in a system of such design, FIG. 4 schematically shows components of an installation similar to FIG. 1 with the additional specification of control and functional features of the various components.

FIG. 3 shows a schematic diagram to illustrate an architecture for the multiagent system. A functionality of the system is provided by agents that provide four functions (also called roles):

a symptom provision function 308,
a situation analysis function 309,
a production control function 311 and
a monitoring mediator function 310.

The top half of FIG. 3 shows these functions and meta models associated with these functions, i.e.

a service meta model 301,
the feature meta model 302 (see also FIG. 2) and
the situation meta model 303 (see also FIG. 2).

A possible implementation of these functions by agents and exemplary specific functions are shown in the bottom section of FIG. 3. Preferably, an ascertainment service is also provided (not shown in FIG. 3) that allows the agents to find interaction partners.

The meta models 301 to 303 comprise relevant domain knowledge and stretch from process information through to definitions of diagnosis aspects, whereas specific agents, i.e.

a production service agent 304,
a product agent 305,
a diagnosis agent 306 and
a maintenance agent 307, comprise knowledge about specific products and processes. The models are used for diagnosis purposes, but are also used as a basis for a service search that brings together information providers and consumers on the basis of the type of information provided and requested. To facilitate automated information processing and to increase reusability and interchangeability of the model, it is possible to use formal semantic terms that are based on what is known as web ontology language (OWL) for example. In particular, the situation meta model 303 is based on the description logic EL, a language element of the OWL 2 EL profile, which allows requests to be answered in polynomial runtime (i.e. efficiently). For the feature meta model 302, it is possible to use the OWL 2 RL profile in order to facilitate interpretation using a rule engine. Both profiles are used in order to reach a compromise between performance and expressiveness for an implementable evaluation method.

Symptom Provider

A symptom provider implements capture of features within a given area of responsibility that is defined by a set of system elements (SystemElement) in the proposed meta model. In particular, the symptom provider comprises the symptom provision function 308 to this end.

In order to provide its functionality for the community of agents, the symptom provider performs registration with the ascertainment service by disclosing the identification numbers of the system elements for which it is responsible. Customers or users (generally: objects) can register with the symptom provider that covers a relevant component for particular event classes that are denoted by subconcepts of the symptom. Following reception of data or a feature from an associated information source or preprocessing component, e.g. a portion of the machine or installation, the symptom provider takes its feature meta model 302 as a basis for automatically inferring the relevant symptom. Subsequently, all customers or users or objects that have registered for this event or one of its superordinate concepts are notified by the symptom provider.

Situation Analysis

The situation analysis comprises the situation analysis function 309, which comprises the process of interpreting symptoms on the basis of the situation meta model 303 and is implemented by the diagnosis agent 306. In order to receive the necessary input data, the situation analysis function 309 subscribes to the symptoms for which it desires notification, as follows: first of all, it asks the ascertainment service for symptom providers that are responsible for the system elements that are associated with this agent for monitoring. The situation analysis function 309 then subscribes or registers with each of these symptom providers for the specific symptoms, including subconcepts of the symptoms (i.e. symptoms that are dependent thereon or subordinate).

Following the reception of a symptom, the situation analysis function 309 prompts the interpretation process, which determines a set of faults (e.g. defects or disturbances) that may possibly be a cause for observations or measured data. By virtue of the assumption being permitted that there are symptoms that have not yet been recognized, the situation analysis function 309 is able to sense faults that have not yet or not yet completely occurred.

A diagnosis that does not require additional symptoms to be assumed has a greater probability of being correct than a diagnosis that is based on the assumptions. Hence, the situation analysis function 309 complements its interpretations with a measure of plausibility.

The services of the situation analysis function 309 can be called on a frequent basis. In order to guarantee the reaction capability and performance of the situation analysis function 309, a subsequently described implementation of the situation analysis uses what is known as an "anytime approach" (i.e. a call is possible at any time and a result is also provided at any time) and a lower limit value pl relating to the quality of the solutions. Depending on configurable threshold values $pl_m$ and $pl_D$, the situation analysis function 309 initiates both automated reactions and interactions from the operator: first of all, a monitoring mediator is informed about the complete set of diagnoses, about the required assumptions therefor and about the plausibility values therefor. If the plausibility of the best diagnosis that has been determined by the situation analysis function 309 exceeds the configurable first threshold value $pl_m$ and if, in the case of the second-best alternative, at least one value is less plausible than the best value by a magnitude of the second threshold value $pl_D$, the situation analysis function 309 prompts the production control devices to additionally automatically take protective measures and to send notification about this decision to the monitoring mediator.

Production Controller

The production controller with the associated production control function 311 is responsible for the interaction with the installation. In this case, a management and a control functionality for the associated system elements are implemented at a higher level, which in turn provides specific options within the production system. The functionality that is implemented by the production controller is provided on higher control systems, for example a production planner, than a service. In order to be locatable, the production controller registers with the ascertainment service. In the event of the system malfunctioning and this being identified by taking account of the threshold values, the production controller is informed about the diagnosis by the situation analysis function. This information allows the production controller to limit the production services provided via the ascertainment service in order to reduce the probability of machine and/or product damage. The model and the fault state that has been recognized by the situation analysis function 309 allow the production controller to limit the capability of the machine or installation as little as possible, in contrast to complete temporary shutdown of the machine or installation as a result of an unspecific general disturbance.

Monitoring Mediator

The monitoring mediator with the associated monitoring mediator function 310 provides an interface between the agent-based automated control system and an operator. Using the monitoring mediator, the operator assigns selected components of the system to the situation analysis and configures plausibility threshold values $pl_m$, $pl_D$, which are used by the production controller, and the lower limit pl, which is used by the situation analysis.

When a set of plausible diagnoses has been captured by the situation analysis, the monitoring mediator allows the operator to examine the alternatives, possibly to change interpretations manually and to revoke automated reactions. Furthermore, the monitoring mediator assists the operator in determining additional information that is not available from automated sensors and in supplying said information to the diagnosis process. The monitoring mediator is therefore preferably a central component in the proposed interactive approach for diagnoses during production.

Exemplary Implementation

Figure 4:
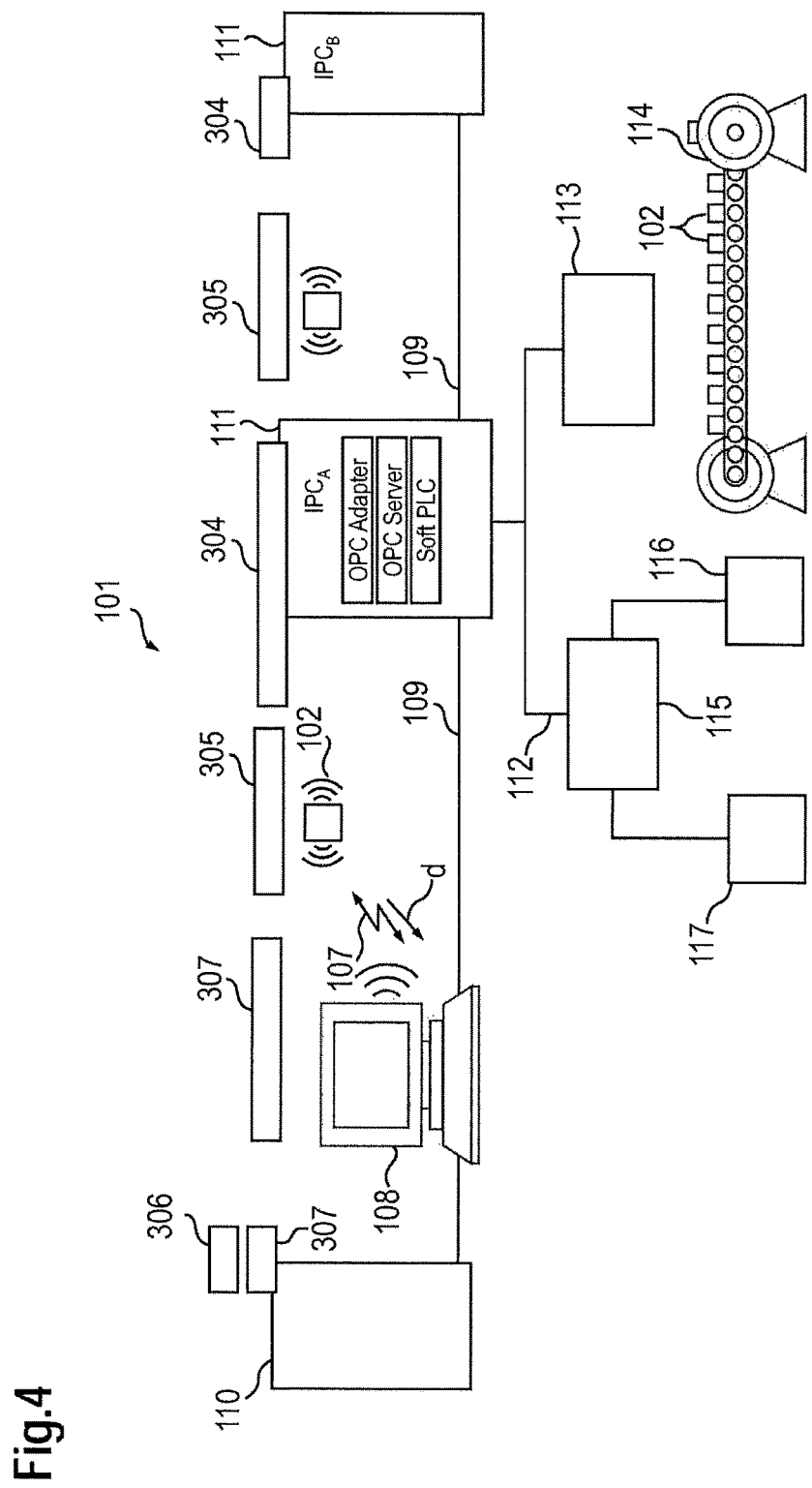

FIG. 4 shows an exemplary implementation of the approach proposed here in an industrial production environment. In this case, the same reference symbols as in FIG. 1 are used for components and functions that are the same or have the same effect as or are at least comparable with those in FIG. 1, and reference is also made to the comments relating to the other Figures, particularly FIG. 1.

So as not to disturb the realtime communication of the automation system, which may be based on PROFINET/PROFIBUS, for example, it is optionally possible for the communication of the multi agent system to be used for an implementation by using communication means that are already installed (e.g. existing company networks). By way of example, the communication means may be TCP/IP networks (TCP: Transmission Control Protocol/network protocol on the internet; IP: Internet Protocol). It is possible to use a standardized or proprietary multi agent platform. The system may also be based on a publically accessible platform. The functionalities required for the services described here are provided by the most available systems. This allows flexible and inexpensive use of the solution presented here.

Production Service Agent

Thus, the production service agent 304 may be produced in the industrial PC 111, for example (see FIG. 4). The production service agent 304 is used both as a symptom provider and for production control. In the latter function, the production service agent 304 allows an operator to configure the production control system. Furthermore, the production service agent 304 controls the production process in order to ensure that configurations are avoided that can result in damage to the machine or the product.

In the symptom provision function 308, the production service agent 304 interprets data provided by machine-mounted sensors. These data reveal features that, using the feature model, result in symptoms (i.e. the symptoms can be derived from the feature model, so that specific symptoms can be determined for specific features). Such a behavior of the production service agent 304 can be achieved by a rule engine, which means that the feature meta model 302 and the feature models can be limited to OWL 2 RL. The sensor and the parameterization data can be accessed in the same way as process variables in a realtime control core (for example based on the OPC UA standard, which involves a locally executed client/server protocol). By way of example, all components, including the infrastructure and the agent itself, can be implemented on the industrial PC 111, which is equipped with a TCP/IP communication link and a programmable controller (e.g. a programmable logic controller, PLC), for example, which executes realtime control. In addition, it should be noted that the realtime control is optional and it may—depending on the area of application—also be possible to use slower (non-realtime) components.

The production service agent 304 can use axle motion sensors in order to derive a symptom: thus, the symptom may be stopping of the axle (AxleStop) or rotation of the axle (AxleTurning).

This is also shown in FIG. 3.

The symptoms are then sent to the diagnosis agent 306, which is installed in the diagnosis system 110, for example, and is registered for the relevant symptom (cf. situation analysis function).

If the production service agent 304 is informed by the diagnosis agent 306 about a plausible diagnosis, the current state of the production system is derived therefrom in order to limit the amount of configurations for the production service, the latter preferably informing the planning system on a higher level.

Product Agent

By way of example, a product sensor is an embedded device that is mounted on or in the product, for example for the life of the product or the duration of production or machining of the product. Preferably, the product sensor is mounted in or on the product only for as long as needed, i.e. particularly for as long as communication with the installation appears appropriate or is possible. The product sensor is preferably equipped with at least one sensor for autonomously monitoring the environment of the product 102.

A product agent 305, which implements the symptom provision function 308, controls the product sensor 102 and provides the measurements of the product sensor for the production control system in the form of symptoms that can be assigned to system elements on the basis of a location of the product. The symptoms are derived from features that are based on the feature model, specifically using a rule engine, which may be implemented in the product sensor, for example. In this case, it should be noted that the product sensor may have a processing unit and/or a communication unit.

Figure 5:
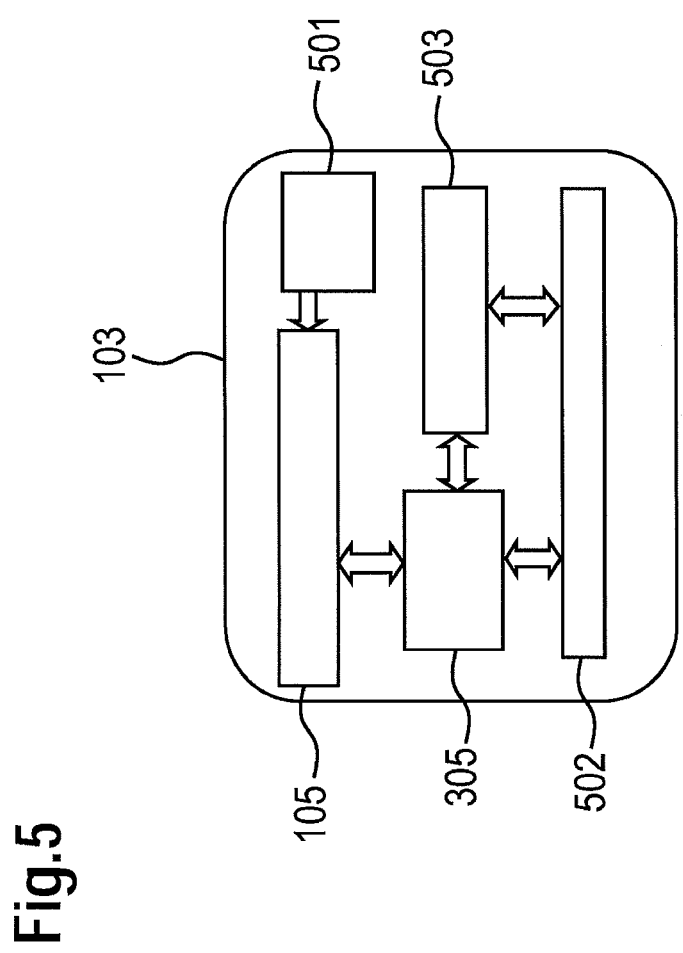
FIG. 5 shows an exemplary architecture for a product sensor or for a processing unit of a product sensor.

FIG. 5 shows a schematic architecture for the product sensor 103 with a multiplicity of components and functions. A sensor module 501 is used for capturing ambient values, for example fluctuations and/or temperatures. The sensor module 501 may, to this end, directly have an appropriately suitable sensor or a port for connecting a sensor. Measured data and from the sensor module 501 can be transmitted via a communication interface 105. The communication with the machine or installation can be performed via various interfaces or media, for example WLAN, Bluetooth, RFID. The communication interface 105 may be connected to the product agent 305, which may correspond in terms of function to the product agent 305 from FIG. 3, for example. The product agent 305 is connected to an (optional) memory 502. Both the product agent 305 and the memory 502 communicate with a rule engine 503, which may be in the form of a state machine, for example. The product sensor 103 can therefore also comprise a processing unit that contains the components 305, 503 and 502, for example. Optionally, the communication interface 105 may also be part of the processing unit. It is also possible for the sensor module 501 to be incorporated in or connected to the processing unit.

By way of example, the product agent 305 can use a local feature model in order to interpret the measurements from its sensor module 501, for example in the form of a three-axis motion sensor, and to determine whether a force is acting on the product 102 on which the product sensor 103 is arranged. In this regard, a distinction can be drawn between the following symptoms (see also FIG. 3), for example:

product is moving (ProductMoving),
product is not moving (ProductStops),
severe (harmful) vibrations are acting on the product (VibrationHigh),
vibrations on the product admissible (VibrationOK).

The symptoms are (preferably when they occur) transmitted to those diagnosis agents that had requested transmission thereof.

Diagnosis Agent

One task of the diagnosis agent 306 is to implement the situation analysis function 309 within the context of a situation model. This involves a knowledge-based diagnosis investigation that can result in a multiplicity of approaches.

One exemplary implementation uses logic-based abduction for the diagnosis in order to allow predictive diagnoses on the basis of incomplete information. In particular, a set of plausible diagnoses can be determined together with the assumptions that are required therefor and the resultant plausibility assessments. Thus, the physical limitations of the product can be taken as a basis for inferring plausible diagnoses, i.e. a multiplicity of diagnoses could be ruled out on the basis of such limitations. This corresponds to a search for optimum paths along a hypergraph, where each hyperpath (corresponding to a graph element) is a diagnosis that is valid in respect of the incomplete information. The hypergraph accordingly contains a multiplicity of paths, each based on a subset of the total admissible set of assumptions.

The structure of the graph is determined by the models, by the observed and assumed symptoms and by the set of plausible diagnoses, the magnitude of the graph being polynomial in respect of the magnitude of the situation model on account of the limitations in the language used for representation. The plausibility of a path is dependent on two factors, namely the observations that it explains and
the assumptions that are required, which introduces an at least proportional order. Since the number of paths may be exponential, an incremental anytime algorithm is preferably used in order to determine the paths successively in the order of decreasing plausibility, stopping when new information arrives or the lower plausibility limit pl is reached. The parameters of the threshold values $pl_m$ and $pl_D$ determine whether a short-term (automated) reaction is meant to be performed by the production service agent 304, the complete set of the competing diagnoses additionally being provided for the maintenance agent 307 together with information regarding required assumptions and plausibilities.

In the exemplary embodiment illustrated, a product 102 on a transferring conveyor belt can capture increasing vibration values while the corresponding component signal (e.g. ascertained using a sensor on the conveyor belt) signals a rotating axle. An explanation for both observations requires no further assumption, since it can be directly recognized that only this transportation path in the installation is vibrating. Alternatively, by way of example, it could be assumed that a jointly used supplying conveyor belt is not running evenly, which might also permit a diagnosis that both transportation paths are vibrating.

Maintenance Agent

Maintenance agents 307 allow user interaction, as defined by the monitoring mediator function 310. Preferably, a maintenance agent 307 can provide a plurality of graphical user interfaces (e.g. produced separately from one another), e.g.

a monitoring view that is incorporated in a command and control center of a factory or installation, and
a maintenance view, which may be set up in a SCADA system WinCC (SCADA: Supervisory Control and Data Acquisition; WinCC: Windows Control Center).

On the basis of the former view, the operator can assign to diagnosis agents 306 components that set threshold values and lower limits and/or select diagnoses that have been derived by the diagnosis agent 306. In this case, the selected diagnoses can be signaled to the diagnosis agent 306, from where it is forwarded to the responsible production service agent 304.

The maintenance view, which may be arranged on a machine control panel, assists the operator in improving the analysis results, e.g. by highlighting relevant data, for example the assumptions that have been made during the ascertainment of the diagnoses, and/or by adding measurements that have been initiated or performed by the operator.

In the case of the present exemplary embodiment, the operator could therefore stipulate that the other conveyor belts must not exceed vibration limit values, in order to reduce the risk of damage to products.

Alternatives, Refinements and Further Advantages

The approach presented here allows a flexible and inexpensive architecture for an agent-based flexible production system that allows a service-based approach to the production, processing or machining of products, each product having at least one product sensor and being able to be in the form of what is known as an intelligent product. This makes it possible to achieve interactive diagnosis for the installation or machine, specifically on the basis of the position of the product and/or ambient conditions acting directly on the product.

Automated production control can be complemented by manual inputs from an operator. To this end, the operator can use a suitable interface to interact with the diagnosis agent, for example.

The product sensors may have a wireless or wired communication interface with or to the installation. The product sensor may be incorporated in the product or mounted on the product, e.g. detachably. The product sensor may have a processing unit and/or a communication unit. The product sensor can deliver product-specific data and/or installation-specific data and/or location-specific data.

The presented approach also has the advantage that decisions are possible even with incomplete data, in order to reduce risks of damage to the installation and/or the product. In particular, experiences of the operator can be taken into account in this context in order to be able to make a decision regarding a diagnosis on the basis of just a small amount of information.

In addition, it is possible to manage with a lack of information such that the diagnosis system draws hypothetical conclusions (makes assumptions) that are then declared valid or rejected as invalid on the basis of additional data, e.g. as a result of additional measurements or as a result of input from the operator.

The presented solution also has the advantage that it can be implemented with minimal complexity on existing systems, and therefore only low costs arise for corresponding updating of existing systems.

Advantageous functional extensions may involve achieving optimization of memory space in an embedded component that is responsible for conclusions by virtue of facts being forgotten (remaining stored only for a prescribed period) or omitted. This can be done in the case of realtime control systems, for example, which deliver (new or amended) data in a quick succession.

It is also possible for model-based planning algorithms to be incorporated into the production service agent in order to implement improved configuration planning and distributed production planning and also market-based mechanisms for coordination of production service agents and product agents. Extensions to the approach may also be semi-automated or automated extractions of necessary models from a large number of planning-relevant information that is produced during installation planning. This could significantly reduce the complexity for implementation of a model-based approach. Another extension can involve the use of more expressive models and complex structures, e.g. groups of factories and production chains.

With a hierarchic approach, diagnoses that have been determined for a factory or installation could be used as symptoms for a complete supply chain: it would therefore be possible to obtain a set of additional information that could be used in targeted fashion to reduce disadvantageous effects in production.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. An installation, the installation being a manufacturing installation or an automation installation and comprising:
    a device to transport, produce or machine a plurality of products, the plurality of products including tremor-sensitive and tremor-insensitive products;
    a product sensor movable with a respective product of the plurality of products as the respective product is being subjected to a production process in which the respective product is transported, produced or machined, the product sensor having
        a sensing unit to measure a physical parameter associated with the respective product to thereby obtain measured data, and
        a communication interface to transmit the measured data or data derived from the measured data, to a diagnosis device of the installation during the production process;
    an installation sensor configured to measure an operational parameter of the device to transport, produce or machine the plurality of products;
    the diagnosis device configured to receive (a) the measured data or data derived from the measured data from the product sensor and (b) the operational parameter measured by the installation sensor during the production process, and to diagnose a problem of the installation based on both (a) the measured data or the data derived from the measured data and (b) the operational parameter measured by the installation sensor, wherein the problem is identified as a conveyer belt vibration problem identified from vibration; and
    a controller to, in response to the diagnosis device having diagnosed the problem, automatically control the installation during the production process by limiting the production process based on the problem diagnosed by the diagnosis device to reduce probability of machine and/or product damage, including rerouting the tremor-sensitive products away from an identified conveyer belt to another conveyer belt in the installation while maintaining the tremor-insensitive products on the identified conveyer belt.

2. The installation as claimed in claim 1, wherein
the product sensor further includes a processor to ascertain a symptom of the problem of the installation based on the measured data or the data derived from the measured data, and the product sensor transmits the ascertained symptom to the diagnosis device through the communication interface.

3. The installation as claimed in claim 2, wherein
the product sensor comprises a memory, and
the processor stores the measured data or the data derived from the measured data in the memory.

4. The installation as claimed in claim 2, wherein the product sensor provides the ascertained symptom to the diagnosis device on a realtime basis.

5. The installation as claimed in claim 2, wherein the processor monitors the measured data and/or the data derived from the measured data.

6. The installation as claimed in claim 2, wherein the diagnosis device uses the ascertained symptom transmitted from the product sensor to diagnose the problem of the installation.

7. The installation as claimed in claim 2, wherein the problem of the installation is associated with a not-yet-detected symptom, the processor makes an assumption regarding the not-yet-detected symptom, and the assumption is used to determine the diagnosis for the problem of the installation.

8. The installation as claimed in claim 1, wherein the product sensor is incorporated in or mounted on the respective product.

9. The installation as claimed in claim 1, wherein the product sensor is incorporated into a material carrier for the respective product.

10. The installation as claimed in claim 1, wherein the communication interface is a wireless communication interface.

11. The installation as claimed in claim 1, wherein the communication interface is a wired communication interface.

12. The installation as claimed in claim 1, wherein the physical parameter measured by the sensing unit is selected from the group consisting of:
    a temperature;
    a relative or absolute position of the product sensor;
    a movement, acceleration or orientation of the product sensor; and
    a vibration of the product sensor.

13. A method of using a product sensor, comprising:
    moving a plurality of product sensors, each respective product sensor associated with a respective product of a plurality of products as each product is transported, produced or machined in a production process performed in an installation, the installation being a manufacturing installation or an automation installation, the plurality of products including tremor-sensitive and tremor-insensitive products;
    measuring, using each respective product sensor, a physical parameter associated with each respective product to thereby obtain measured data;

transmitting the measured data or data derived from the measured data, to a diagnosis device of the installation during the moving;

measuring, using an installation sensor, an operational parameter of an installation device used in the production process to transport, produce or machine the plurality of products;

transmitting the measured operational parameter to the diagnosis device of the installation;

diagnosing, by the diagnosis device, a problem of the installation based on both (a) the measured data or the data derived from the measured data and (b) the operational parameter measured by the installation sensor, wherein the problem is identified as a conveyer belt vibration problem identified from vibration; and in response to the problem having been diagnosed, controlling the installation, automatically using a controller, during the production process by limiting the production process based on the problem diagnosed by the diagnosis device to reduce probability of machine and/or product damage, including rerouting the tremor-sensitive products away from an identified conveyer belt to another conveyer belt in the installation while maintaining the tremor-insensitive products on the identified conveyer belt.

* * * * *